116,373

UNITED STATES PATENT OFFICE.

JUDSON L. THOMSON, OF SYRACUSE, NEW YORK.

IMPROVEMENT IN WATER-PROOF CIGAR-BOXES.

Specification forming part of Letters Patent No. 116,373, dated June 27, 1871.

*To all whom it may concern:*

Be it known that I, JUDSON L. THOMSON, of Syracuse, in the county of Onondaga and State of New York, have invented a certain new and Improved Cigar-Box, of which the following is a specification:

The important objects sought for in cigar-boxes are the keeping of the cigars secure from injury in packing and shipping and in protecting them from loss of aroma and from dampness, &c. For this purpose cigar-boxes have been made of wood, nailed together with great care and at considerable expense, the joint being carefully covered with paper to exclude the air; but long experience has proved that cigars packed in these boxes not only imbibe from the box unpleasant flavors, but, by evaporation, lose their natural flavor, become dry, and comparatively worthless by long standing in them. The boxes are expensive, troublesome to pack and fasten up, which is done by nailing and pasting to properly secure them. To obviate these objections I have devised my new cigar-box, which does away with all the difficulties before enumerated, and at a cost far less than the old box, with much greater durability and beauty.

For this purpose I form a box of stiff pasteboard, gluing the parts together to make them firm with a water-proof glue, cement, or paste. I then cover with ornamental or printed colored papers, and I prefer the well-known parchment paper for that purpose. The cover is made with a rim that shuts down over the top of the box like a chest, and is fastened with any suitable catch. The box, thus constructed, I coat with a suitable water-proof varnish, which I prefer to make of shellac dissolved in alcohol. This renders the box impervious to water, and a double coat of this water-proof covering completes the box.

Cigars packed in these boxes retain their flavor, natural or artificial, without imbibing anything unpleasant from the box.

The cost of this box is much less than that of wood heretofore employed, and it is less liable to get broken or split by handling; it is more conveniently, expeditiously, and cheaply fastened and opened; and retains the cigars in more perfect order and free from deterioration by keeping.

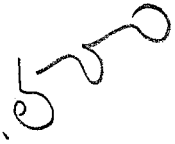

I claim as my invention—

The employment of paper boxes, constructed substantially as above described, for packing, keeping, and transporting cigars, as and for the purposes set forth.

JUDSON L. THOMSON.

Witnesses:
 ELIZA GREENOUGH,
 J. J. GREENOUGH.